US010429487B1

(12) United States Patent
Fowe

(10) Patent No.: US 10,429,487 B1
(45) Date of Patent: Oct. 1, 2019

(54) DRONE LOCALIZATION

(71) Applicant: HERE Global B.V., Eindhoven (NL)

(72) Inventor: James Fowe, Chicago, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 15/983,492

(22) Filed: May 18, 2018

(51) Int. Cl.
G01S 19/13 (2010.01)
G01S 5/02 (2010.01)
G01S 5/00 (2006.01)
G01S 19/06 (2010.01)
G01S 11/04 (2006.01)
G01S 19/12 (2010.01)
G06F 16/29 (2019.01)

(52) U.S. Cl.
CPC .......... G01S 5/0289 (2013.01); G01S 5/0072 (2013.01); G01S 11/04 (2013.01); G01S 19/06 (2013.01); G01S 19/12 (2013.01); G06F 16/29 (2019.01)

(58) Field of Classification Search
CPC ....... H04W 84/18; H04W 4/38; H04W 24/10; H04W 4/021; H04W 4/023; H04W 72/0406; H04W 36/30; H04W 36/32; H04W 64/00; H04L 67/12; G06F 17/30241
See application file for complete search history.

(56) References Cited

U.S. PATENT DOCUMENTS

| 8,649,565 | B1 | 2/2014 | Kim et al. | |
| 8,938,211 | B2* | 1/2015 | Das | H04W 4/04 370/338 |
| 10,075,813 | B1* | 9/2018 | Struhsaker | H04W 4/023 |
| 10,075,935 | B1* | 9/2018 | Bavand | H04W 64/006 |
| 2004/0068416 | A1 | 4/2004 | Solomon | |
| 2016/0114487 | A1 | 4/2016 | Lacaze et al. | |
| 2016/0207637 | A1* | 7/2016 | Campillo | B64C 39/024 |
| 2017/0108609 | A1* | 4/2017 | Haddy | B64C 39/024 |
| 2018/0067187 | A1* | 3/2018 | Oh | H04W 64/00 |
| 2018/0158197 | A1* | 6/2018 | Dasgupta | G05D 1/0094 |

OTHER PUBLICATIONS

Ackerman, Evan. "This Autonomous Quadrotor Swarm Doesn't Need GPS." IEEE Spectrum: Technology, Engineering, and Science News, IEEE Spectrum, Dec. 27, 2017, spectrum.ieee.org/automaton/robotics/drones/this-autonomous-quadrotor-swarm-doesnt-need-gps.
Ekberg, Pontus. "Swarm-intelligent localization," Uppsala University, (2009).

(Continued)

Primary Examiner — Liton Miah
(74) Attorney, Agent, or Firm — Lempia Summerfield Katz LLC

(57) ABSTRACT

An apparatus is configured to perform a method for collaborative localization of multiple devices in a geographic area including receiving global localization data originating with one or more neighboring devices, receiving local localization data originating with a mobile device, determining a first confidence level from the local localization data, determining a second confidence level from the global localization data, and performing, by a processor, a collaborative localization calculation for the mobile device based on the first confidence level and the second confidence level.

20 Claims, 15 Drawing Sheets

(56) References Cited

OTHER PUBLICATIONS

Hattori, Kiyohiko et al. "Hybrid indoor location estimation system using image processing and WiFi strength." Wireless Networks and Information Systems, 2009. WNIS'09. International Conference on. IEEE, 2009.

Saska, Martin, Jan Vakula, and Libor Přeučil. "Swarms of micro aerial vehicles stabilized under a visual relative localization." Robotics and Automation (ICRA), 2014 IEEE International Conference on. IEEE, 2014.

Scaramuzza, Davide et al. "Vision-controlled micro flying robots: from system design to autonomous navigation and mapping in GPS-denied environments." IEEE Robotics & Automation Magazine 21.3 (2014): 26-40.

Zhang, Ping et al. "Cooperative localization in 5G networks: A survey" ICT Express 3.1 (2017): 27-32.

Rajagopalan, Sundaram and Chien-Chung Shen. "ANSI: A swarm intelligence-based unicast routing protocol for hybrid ad hoc networks." Journal of Systems Architecture 52.8-9 (2006): 485-504.

* cited by examiner

DRONE LOCALIZATION

FIELD

The following disclosure relates to the collaborative localization of mobile devices base on more than one localization technique through a network of the mobile devices.

BACKGROUND

The Global Positioning System (GPS) or another global navigation satellite system (GNSS) provides location information to a receiving device anywhere on Earth as long as the device has a substantial line of sight without significant obstruction to three or four satellites of the system. The accuracy of GPS changes over time and is not reliable enough for some applications, or in some areas.

GPS calculations may vary according to the specific GPS receiver or the position and availability of GPS satellites because clustered satellites may cause errors. The accuracy of GPS may depend on the path of the GPS signals as they are affected by objects such as terrain, buildings, or weather. Some GPS signals may reflect from these objects. The GPS receiver may receive both the original, direct signal and the new, reflected signal. The resulting errors introduced in the GPS calculations are multipath errors or multipath interference.

SUMMARY

In one embodiment, a method for collaborative localization of multiple devices in a geographic area including receiving global localization data originating with one or more neighboring devices, receiving local localization data originating with a mobile device, determining a first confidence level from the local localization data, determining a second confidence level from the global localization data, and performing, by a processor, a collaborative localization calculation for the mobile device based on the first confidence level and the second confidence level.

In one embodiment an apparatus for collaborative localization of multiple devices in a geographic area including a localization database and a collaborative localization controller. The localization database includes global localization data originating with one or more neighboring devices and associated with a first confidence level and local localization data originating with a mobile device and associated with a second confidence level. The collaborative localization controller configured to perform a collaborative localization calculation for the mobile device based on the first confidence level and the second confidence level.

In one embodiment a system for collaborative localization of multiple devices in a geographic area includes a mobile device and a drone. The mobile device is configured to perform a first localization and calculate a first confidence level. The drone is configured to perform a second localization and calculate a second confidence level. A collaborative localization calculation for a location of the mobile device is based on the first confidence level, the second confidence level, the first localization, and the second localization.

BRIEF DESCRIPTION OF THE DRAWINGS

Exemplary embodiments of the present invention are described herein with reference to the following drawings.

DETAILED DESCRIPTION

GPS positioning may be partially or fully inoperable in various situations. For example, multipath errors may cause partial interruption of GPS positioning in urban areas. Multipath occurs when the GPS satellite signal take a reflective path to the receiver. The accuracy of GPS may have a greater degree of error (higher resolution) than other positioning technologies. The other position technologies may be used to augment the GPS technologies.

Fifth generation wireless systems (5G) include a variety of technologies and protocols. For example, massive multiple in multiple out (MIMO) which may include multiple receiving antennas and/or multiple sending antennas. Some examples may include 64 receiving antennas and 64 sending antennas or 128 receiving antennas and 128 sending antennas. Additional antennas provide increased number of transmit and send streams, which increases bandwidth. 5G will also include improved native machine to machine (peer to peer) communication.

The following embodiments relate to several technological fields including but not limited to positioning technologies in navigation, autonomous driving, assisted driving, traffic applications, and other location-based systems. The following embodiments achieve advantages in each of these technologies as positioning techniques are made more accurate as well as consistent over a geographic area. Improved positioning improves navigation because user devices may be routed more precisely from an origin to the destination. Indoor navigation technologies more easily achieve the resolution necessary to traverse hallways and other narrow spaces. Autonomous driving technology is improved by the improved positioning technology because vehicles can be controlled (e.g., steering, acceleration, braking) accurately even when GPS positioning is not fully available or accurate enough for autonomous driving. Similarly, warnings provided by assisted driving are more accurate with improved positioning, eliminating false positives and errors in the warnings. In addition, users of navigation, autonomous driving, assisted driving, traffic applications, and other location-based systems are more willing to adopt these systems given the technological advances in positioning.

Figure 1:
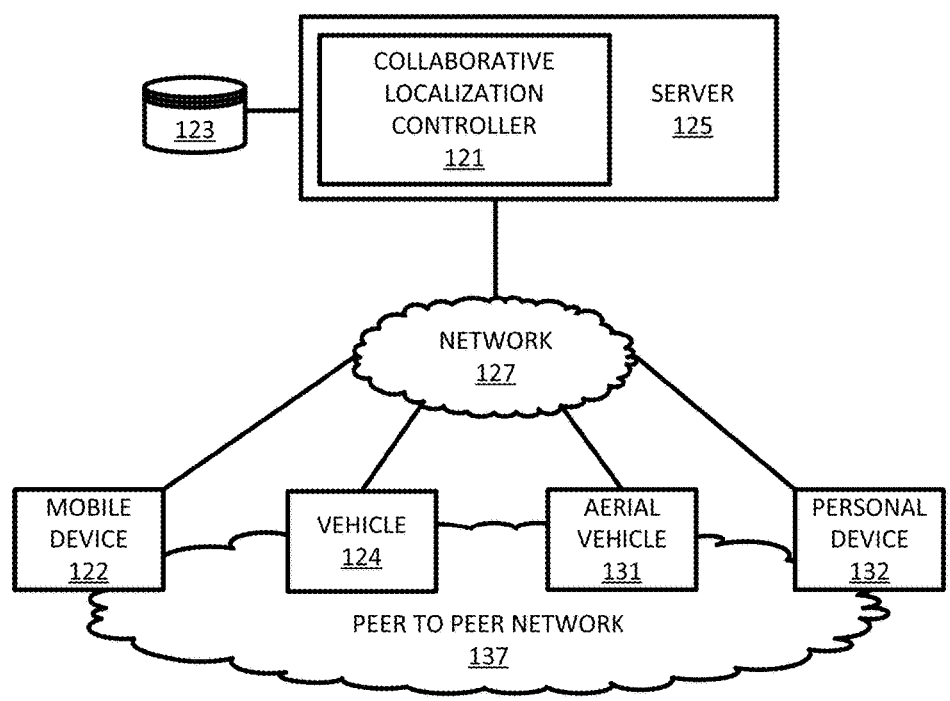
FIG. 1 illustrates an example system for collaborative localization among mobile devices.

FIG. 1 illustrates an example system for collaborative localization among mobile devices. The system includes a server 125 including a collaborative localization controller 121 and a geographic database 123. The server 125 communicates via network 127 to one or more devices. Example devices include mobile device 122, vehicle 124, aerial vehicle 131, and personal device 132. The devices may communicate directly through peer to peer network 137. The peer to peer network 137 may allow ad hoc connections between the devices. The devices may also communicate with each other through the network 127.

Collaborative localization may mean that multiple devices collaborate to calculate the locations of at least one of the mobile devices. Localization is the process of calculating the location of a mobile device. Various localization techniques may include signal-based ranging, object-based ranging, triangulation, trilateration or other techniques. Localization techniques may be performed at devices including mobile device 122, vehicle 124, aerial vehicle 131, and personal device 132. The localization technique may be performed at collaborative localization controller 121.

Signal based ranging may include an angle of arrival calculation to determine an angle that a propagating wave is incident on an antenna. With respect to a baseline direction (e.g., parallel with the surface of the earth, gravity, or a cardinal direction such as north, west, east, south), the angle of arrival calculation determines an angle between the recipient of the propagating wave (e.g., mobile device 122) and a transmitter (e.g., base station or tower).

In one example, the angle of arrival calculation compares the strength of the signal from two separate parts of the antenna. The separate parts may be different antenna elements spaced by a predetermined distance. In another example, the receiving is rotated to determine a position with the signal is at a maximum at a particular antenna element or portion of the antenna.

Ranging may include received signal strength, which may a received signal strength indicator (RSSI) measured at the device. The RSSI may decrease proportionally to the square of the distance. A filter, such as a Kalman filter, may be applied by the mobile terminal or the collaborative localization controller 121. The filter may compare a series of measurements in time and associated uncertainties to generate accurate estimation of the measurements. An independent estimate of the changing position of the mobile terminal, which may be determined from control of the vehicle, GPS, or an inertial measurement unit (IMU), Object based ranging may be based on images collected by a camera at one of the devices including mobile device 122, vehicle 124, aerial vehicle 131, and personal device 132. The images may be analyzed to identify one or more objects with a corresponding location stored in the geographic database (e.g., local database or database 123). Example objects may include road signs, buildings, points of interest (POIs), roads, lane markers, or a geographic marker. The camera may be a visible spectrum camera, an infrared camera, an ultraviolet camera or another camera.

Object based ranging may be based on a distance ranging system. The devices include mobile device 122, vehicle 124, aerial vehicle 131, and personal device 132, may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. Other types of pathways may be substituted for the roadway in any embodiment described herein. The distance ranging system may include a sound distance system such as sound navigation and ranging (SONAR), a radio distancing system such as radio detection and ranging (RADAR) or another sensor.

In triangulation, two or more static locations of transmitters are known. Examples include the positions of towers or base stations. In some examples, the known positions may be other mobile devices. Angles are measured between lines connecting the two or more towers or base stations. Using geometric definitions of related triangles, the distances between the two or more towers or based stations and the mobile device are calculated.

In trilateration, distances are known between known positions. Angles are calculated using the geometric definitions of circles, triangles, or spheres. No angles are measured in trilateration. In a two-dimensional plane, the distance of a mobile device to two known positions defines the mobile distance to the intersection of two circles, which is two points. When the distance to a third known position is known, the system should define the position of the mobile device to a single point.

Each mobile terminal may include position circuitry such as one or more processors or circuits for generating probe data. The probe data may be generated by receiving GNSS signals and comparing the GNSS signals to a clock to determine the absolute or relative position of the mobile terminal. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The mobile device 122 may use the probe data for local applications. For example, a map application may provide a map to the user of the mobile device 122 based on the current location. A social media application may provide targeted content based on the current location. A game application may provide a setting or objects within the game in response to the current location.

Communication between the mobile terminals and/or with the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be 5G wireless protocols but may optionally include one or more of analog advanced mobile phone system (AMPS), the global system for mobile communication (GSM), third generation partnership project (3GPP), code division multiple access (CDMA), personal handyphone system (PHS), and 4G or long-term evolution (LTE) standards, DSRC (dedicated short-range communication), or another protocol.

In FIG. 1, one or more vehicles 124 are connected to the server 125 though the network 127. The mobile device 122, vehicle 124, aerial vehicle 131, and personal device 132, which may be referred to collectively or individually as mobile terminals. The mobile terminals may communicate directly with the server 125 or through another one of the mobile terminals. For example, the vehicles 124 may be directly connected to the server 125 or through an associated mobile device 122. A map developer system, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the mobile terminals travel. The mobile devices 122 may be standalone devices such as smartphones or devices integrated with vehicles.

The aerial vehicles 131 may include any flying vessel, which may be manned or unmanned, including helicopters, hovercraft, or an unmanned aerial vehicle (UAV). The UAV may be a drone. The drone may include multiple blades for lift and propulsion. The drone may be agile in flight and moveable in multiple degrees of freedom. The drones may operate autonomously or be remotely controlled by a nearby user using radio frequency or other wireless commands, which may be routed through the network 127. The copter class of UAVs or drones may include any number of spinning blades that create lift by forcing air downward or in other directions. The aerial vehicles 131 may provide positioning assistance to other mobile terminals. The aerial vehicles 131 may also provide other functions such as surveillance, aerial photography, surveying, package delivery, robot waiters, and other applications.

The personal device 132 may be a wearable device including a microcontroller. The personal device 132 may be worn on a human body. The personal device 132 may be a tracking device that returns a position to the server 125. The tracking device may include a color or other type of shoe or clothing for children or animals. The personal device 132 may include a pair of glasses or other heads up device including a display. The personal device 132 may include a smartwatch, a fitness tracker, a glove, or other type of device. Additional, different, or fewer components may be included.

The following embodiments determine a position of a particular mobile terminal, which may be referred to as a selected mobile terminal, based on data from the selected mobile terminal and one or more mobile terminals in the vicinity of the selected mobile terminal. The term vicinity may mean within direct peer to peer communication using peer to peer network 137.

The collaborative localization controller 121 may receive localization data from the mobile terminals. The collaborative localization controller 121 may receive local localization data originating with the selected mobile terminal and receive global localization data originating with one or more neighboring devices that is in the same geographic area as the mobile terminal.

The collaborative localization controller 121 may identify or determine a first confidence level (local confidence level) from the local localization data. The local localization data may include a time series of data collected over a time period. The time period may be defined by a predetermined number of samples. The time period may be 100 milliseconds, 500 milliseconds, 1 second or another a relatively short amount of time. The predetermined number of samples may be 10 samples, 100 samples, or 1000 samples. In these examples, a sampling rate of 1 kHz or 1000 samples per second may be used. The collaborative localization controller 121 may sample the local localization data or receive the samples for the time period.

The time series of data includes a set of measurements collected for the local localization data. The measurements may include sensor data such as GPS signals, signal strength data from one or more base stations or towers, angle data from one or more base stations or towers, object data from one or more distance ranging sensors, or other sensor data. The measurements may include the calculated geographic coordinates from the sensor data. The mobile terminal or collaborative localization controller 121 may be configured to calculate a relative position between the mobile device and the one or more neighboring devices based on time of arrival, time difference of arrival, angle of arrival, trilateration, or triangulation.

The local confidence level may be calculated based on a statistical analysis. The local confidence level may describe how confident the average value over the time period for the measurement data describes the actual value of the parameter described in the measurement data. For example, when the measurement data is sensor data for a signal strength, the local confidence level describes how close the measured signal strength data is to the actual signal strength. When the measurement data is a geographic location, the local confidence level describes how close the measured geographic location is to the actual geographic location. The local confidence level may be inversely related (e.g., inversely proportional, or negatively exponentially) to the variance or standard deviation in the measurement data over the time period.

The time period may be selected according to the type of mobile terminal. The time period may be selected according to the likelihood that the mobile terminal is moving and/or the potential speed range of the mobile terminal. For example, mobile devices 122 such as smart phones may use a first time period, vehicles 124 may use a second time period, and aerial vehicles 131 may use a third time period. The time period for the type of mobile terminal may depend on historical data for that type of mobile terminal. The time period may also be based on a specific user or specific mobile terminal. The time period may be based on the historical movement of the mobile terminal.

The local confidence level may be calculated or determined based on the type of localization or the type of sensor used. For example, the mobile terminals or collaborative localization controller 121 may include a table that associates localization techniques with confidence levels. Object based distance detection systems may be associated with a first confidence level, Image based positioning may be associated with a second confidence level, signal based ranging may be associated with a third confidence level, triangulation may be associated with a fourth confidence level, and trilateration may be associated with a fifth confidence level. The first confidence level may be higher than the second confidence level, which is higher than the third confidence level, which is higher than the fourth confidence level, which is higher than the fifth confidence level. However, any of the localization techniques may be ranked and have variable confidence levels based on an analysis of historical data or testing.

The collaborative localization controller 121 may identify or determine a second confidence level (global confidence level) from the global localization data from the one or more neighboring devices. The global localization data may include a time series of data collected over a time period. The time period may be defined by a predetermined number of samples or length of time.

The time series of data includes a set of measurements collected for the global localization data. The set of measurements may describe an image of an object near the one or more mobile devices. The object may be a marker in a previously recorded position.

In addition or in the alternative, the global localization data may include sensor data such as GPS signals, signal strength data from one or more base stations or towers, angle data from one or more base stations or towers, object data from one or more distance ranging sensors, or other sensor data. The measurements may include the calculated geographic coordinates from the sensor data.

The confidence level for the global localization data may be calculated based on a statistical analysis. The confidence level may describe how confident the average value over the time period for the measurement data describes the actual value of the parameter described in the measurement data. When the measurement data includes images for a geographic marker, the confidence level may be calculated based on how well the marker is identified. That is, the marker may be matched using image processing or computer vision techniques, and the confidence level is calculated based on the performance of these techniques.

In addition, when the measurement data is sensor data for a signal strength, the confidence level describes how close the measured signal strength data is to the actual signal strength. When the measurement data is a geographic location, the confidence level describes how close the measured geographic location is to the actual geographic location. The confidence level may be inversely related (e.g., inversely proportional, or negatively exponentially) to the variance or standard deviation in the measurement data over the time period.

The time period for the second confidence level for the global localization data may be selected according to the type of mobile terminal. Aerial vehicles imaging markers may have a specific time period. The global confidence level may be calculated or determined based on the type of localization or the type of sensor used. For example, the mobile terminals or collaborative localization controller 121 may include a table that associates localization techniques with confidence levels.

The collaborative localization controller 121 may perform a collaborative localization calculation for the mobile device based on the first confidence level and the second confidence level. The collaborative localization controller 121 may compare the first confidence level and the second confidence level. The collaborative localization controller 121 may determine whether the local confidence level or the global confidence level is greater, and by how much. For example, when the local confidence level exceeds the global confidence level, the collaborative localization controller 121 selects the position determined from the local localization technique as the position of the mobile device. Conversely, when the global confidence level exceeds the local confidence level, the collaborative localization controller 121 selects the position determined from the global localization technique as the position of the mobile device.

In other examples, the collaborative localization controller 121 may combine the local and global localization results. For example, when the local localization technique is within a predetermined range (e.g., a percentage such as 5%) of the global localization technique, the collaborative localization controller 121 may average the positions determined from the two techniques.

More than two and any number of confidence levels may be compared by the collaborative localization controller 121. The collaborative localization controller 121 may receive localization data from multiple mobile terminals and/or using multiple localization techniques. The collaborative localization controller 121 may determine confidence levels for each of the mobile terminals and/or localization techniques and compare the confidence levels. The collaborative localization controller 121 may perform a collaborative localization calculation for the mobile device based on the comparison by selecting the highest confidence level and position data from the corresponding mobile terminal and/or localization technique. Alternatively, the default localization provided by the collaborative localization controller 121 may be the local localization unless the global confidence level exceeds a collaboration threshold. The collaborative localization controller 121 may compare the global confidence level to a collaboration threshold, and in response to the global confidence interval exceeding the threshold, provide the global localization data rather than the local localization data.

Figure 2:
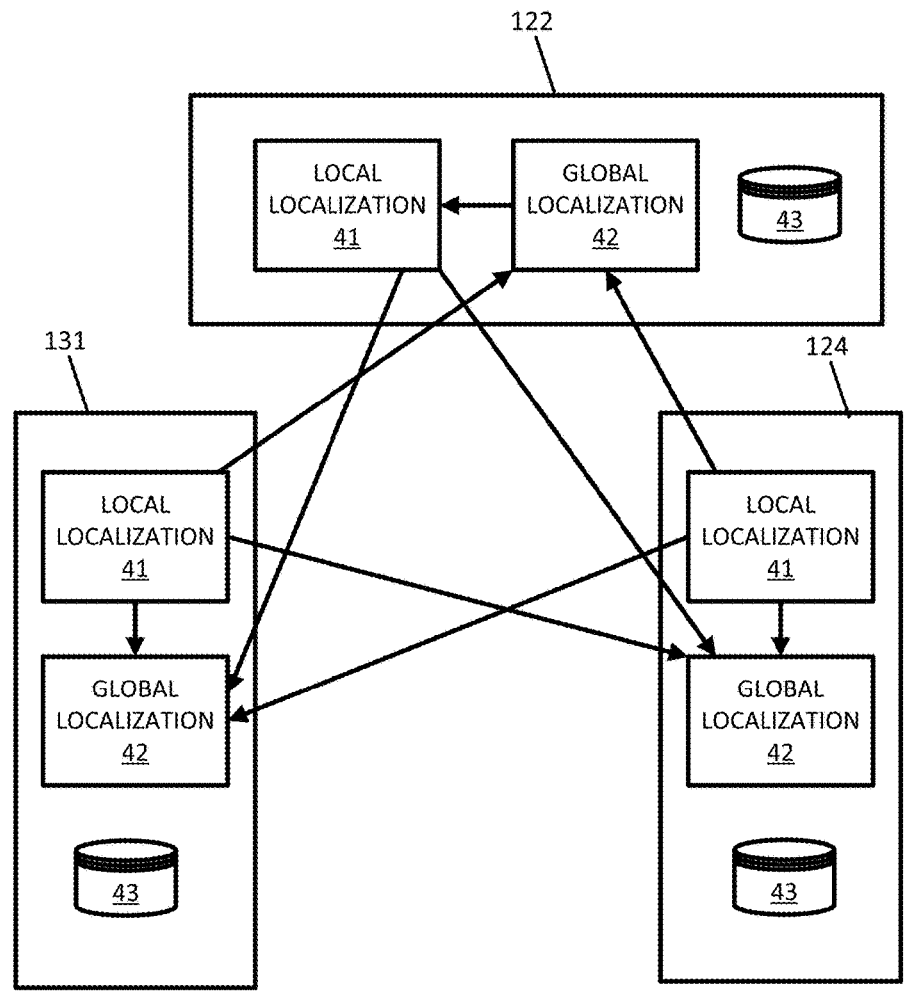
FIG. 2 illustrates an example localization technique for the system of FIG. 1.

FIG. 2 illustrates an example localization technique for the system of FIG. 1. FIG. 2 includes the mobile device 122, the vehicle 124, and the aerial vehicle 131, but may be applied to any type of mobile terminal. Each of these devices may perform two positioning or localization techniques, including local localization module 41 configured to perform local localization calculations and global localization module 42 configured to perform global localization calculations. Each of these devices may include a local database 43, which may be a subset of the geographic database 123. The local localization is based on data collected at the respective mobile terminal. The global localization is additionally or alternatively based on data collected at other mobile terminals.

The local localization may include is based on data collected at the respective mobile terminal. As described herein, the local localization may include signal-based ranging, object-based ranging, triangulation, trilateration or other techniques.

The global localization may include data collected at one or more mobile terminals that are neighboring the mobile terminal. Neighboring mobile terminals may be mobile terminals that are within range of direct communication with the selected mobile terminal.

The mobile terminal may receive global localization data originating with one or more neighboring devices and receive local localization data originating with the mobile device. For example, in FIG. 2 the mobile device 122 may perform a first localization using data collected at the mobile device 122, and the mobile device 122 may perform a second localization using data collected at the vehicle 124 and/or the aerial vehicle 131. That is, for each respective global localization module 42 in FIG. 2, the results of the localization module 41 at the other devices are received and provides as inputs for calculating the global location. The data collected at any individual mobile terminal provides the basis for the local localization for that mobile terminal, and the data collected at the neighboring mobile terminals provide the basis for the global localization.

The mobile terminal may calculate confidence levels for the local localization data and the global localization data. As described herein, the confidence levels may be determined based on a statistical analysis of the data (e.g., confidence interval from the variance in the data over a time period).

The mobile terminal may compare the confidence levels to determine a collaborative localization from the local and global localization techniques. In one example, the localization technique with the highest confidence level is selected and used as the position for the mobile terminal. In other examples, the global and local localization results are combined. Alternatively, the default localization provided by mobile terminal may be the local localization unless the global confidence level exceeds a collaboration threshold. The mobile terminal may compare the global confidence level to a collaboration threshold, and in response to the global confidence interval exceeding the threshold, provide the global localization data rather than the local localization data.

Figure 3:
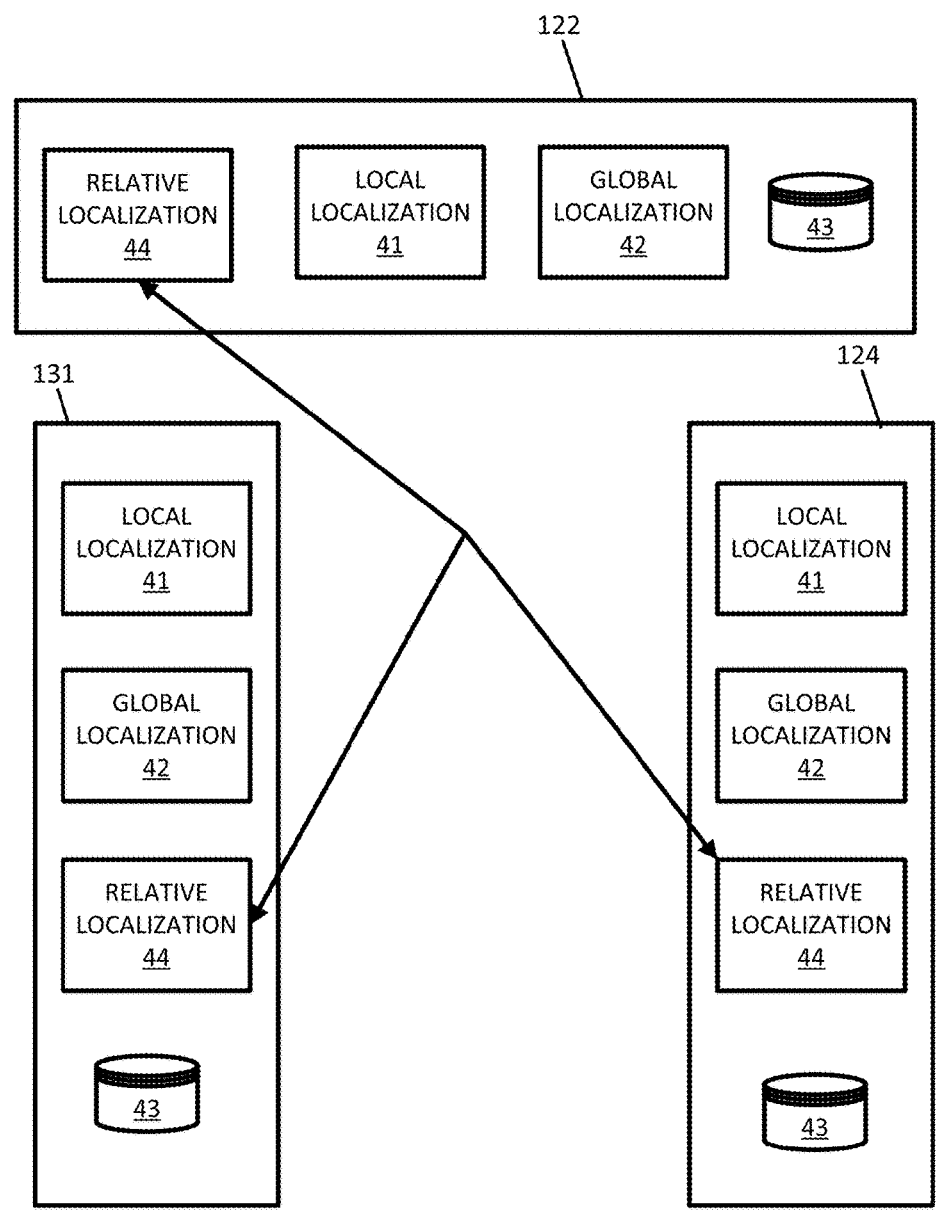
FIG. 3 illustrates another example localization technique for the system of FIG. 1.

FIG. 3 illustrates another example localization technique for the system of FIG. 1. FIG. 3 includes a relative location reference module 44. The relative location reference module 44 may calculate a location of the mobile terminal between two reference points (e.g., between two nodes of a road network) or along a reference length (e.g., along a rod segment of a road network).

The location estimated from the relative location reference module 44 may be shared with other mobile terminals and used in global localization by the other mobile terminals. The relative location reference module 44 may estimate the relative distance from a convergence of the swarm intelligence algorithms. The relative location allows module 44 to calculate the relative distance from neighboring nodes such that when the neighboring nodes acquire global localization information, it automatically allows module 44 to obtain its own global localization. Global localization can come from cell-tour triangulation.

FIGS. 4-9 illustrate scenarios for the system of FIGS. 1-3 to provide collaborative localization technique. Each of FIGS. 4-9 depicts an arrangement of mobile terminals such that localization provided at one or more of the mobile terminals assists localization at another mobile terminal.

Figure 4:
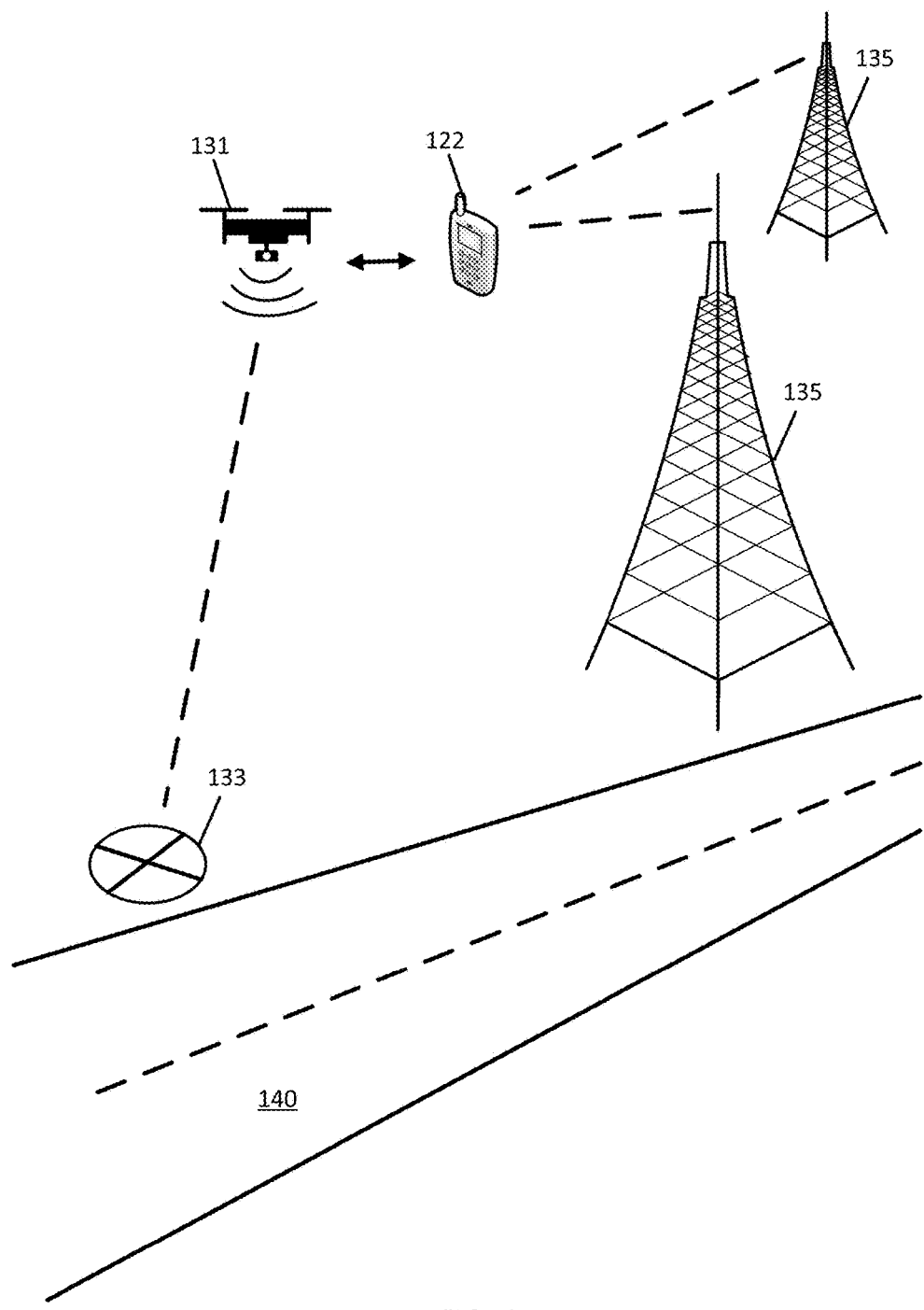
FIG. 4 illustrates an example collaborative localization technique.

FIG. 4 illustrates an example collaborative localization technique for a set of mobile terminals includes an aerial vehicle 131 and a mobile device 122. Each of the aerial vehicle 131 and the mobile device 122 may perform a local localization as well as a global localization based on data received from the other mobile terminal.

The mobile device 122 may perform local localization based on signals received from base stations or towers 135. The local localization may use any combination of signal-based ranging, triangulation, trilateration or other techniques.

The aerial vehicle 131 may perform local localization for the aerial vehicle 131 based on marker 133. The marker 133 may be associated with a particular geographic location, for example, as stored in geographic database 123.

The marker 133 may include data for a geographic location encoded as a quick response (AR) code, a universal product code (UPC), an alphanumeric code, a hexadecimal code, a binary code, a geometric shape, or another code. For example, an alphanumeric code may represent latitude and longitude coordinates.

The aerial vehicle 131 (or the collaborative localization controller 121) may detect marker 133 using a camera. An image processing technique may be used to analyze an image collected by the camera to identify the data encoded for the geographic location.

The aerial vehicle 131 may also calculate a distance to the marker 133. The distance may be determining in a variety of techniques. The distance may be calculated from the image of the marker 133. For example, the size of the marker 133 in the image may determine how far away the marker 133 is from the aerial vehicle 131. For example, one or more camera properties such as focal length, zoom, and image dimensions may determine the spatial resolution of the image. The spatial resolution may represent how many pixels in the image corresponds to a unit of length or area in the geographic space. From the spatial resolution, the aerial vehicle 131 (or the collaborative localization controller 121) may measure the image size of the marker 133 and calculate the geographic distance to the marker 133. The geographic distance to the marker 133 is used to calculate the height or altitude of the aerial vehicle 131.

In a similar manner, the aerial vehicle 131 (or the collaborative localization controller 121) may determine an orientation or an angle between the aerial vehicle 131 and the marker 133. The aspect ratio or one or more dimensions of features of the marker 133 may indicate the angle. For example, a cross viewed at an angle will appear to have longer crossbars at the side closer to the camera and shorter crossbars at the side farther from the camera. The height or altitude of the aerial vehicle 131 may be calculated from the angle between the aerial vehicle 131 and the marker 133.

The aerial vehicle 131 may also detect a height or altitude of the aerial vehicle 131 from sensor data. The sensor data may include pressure measurements, GPS measurements, or measurements from an IMU.

The aerial vehicle 131 performs local localization of the aerial vehicle 131 based on one or more of the identity of the marker 133 matched to geographic database 123, the orientation or angle of the marker 133 calculated from an image of the marker 133, and/or the height of the aerial vehicle 131 determined from sensor data.

The aerial vehicle 131 may utilize a simultaneous localization and mapping (SLAM) protocol to generate a map at the same time that the markers 133 are used to estimate latitude, longitude, and altitude. The SLAM protocol may also incorporate a separate altitude measurement.

SLAM algorithms from the SLAM protocol may be utilized to build an artifact or database of reference markers with image processing information. The database may be used to convert image-size and perspective to altitude or height of the aerial vehicle 131 in reference to the marker 133.

In some examples, one or more highly equipped aerial vehicles 131 may generate the artifact or database and other aerial vehicles 131 may use the artifact or database. The SLAM algorithm is used in generating this artifact/database may include advanced sensors (e.g., vision, LIDAR sensors, etc.) to obtain and store this data a priori. Subsequently, other aerial vehicles with less-equipped sensors (e.g. camera only) traverse the same location, these aerial vehicles are able to infer their localization from the database.

The results of local localization in the aerial vehicle 131 may be sent to the mobile device 122 for the global localization from the peer to peer network 137. The distance between the aerial vehicle 131 and the mobile device 122 may be determined from an analysis of the signals transmitted through the peer to peer network 137. The analysis may include a comparison of a signal strength (e.g., RSSI or another power measurement) to one or more expected signal strengths. The analysis may include the free space path loss relationship between signal strength and distance. The aerial vehicle 131 (or the collaborative localization controller 121) performs collaborative localization by combining the localization from the aerial vehicle 131 with the localization from the mobile device 122.

Figure 5:
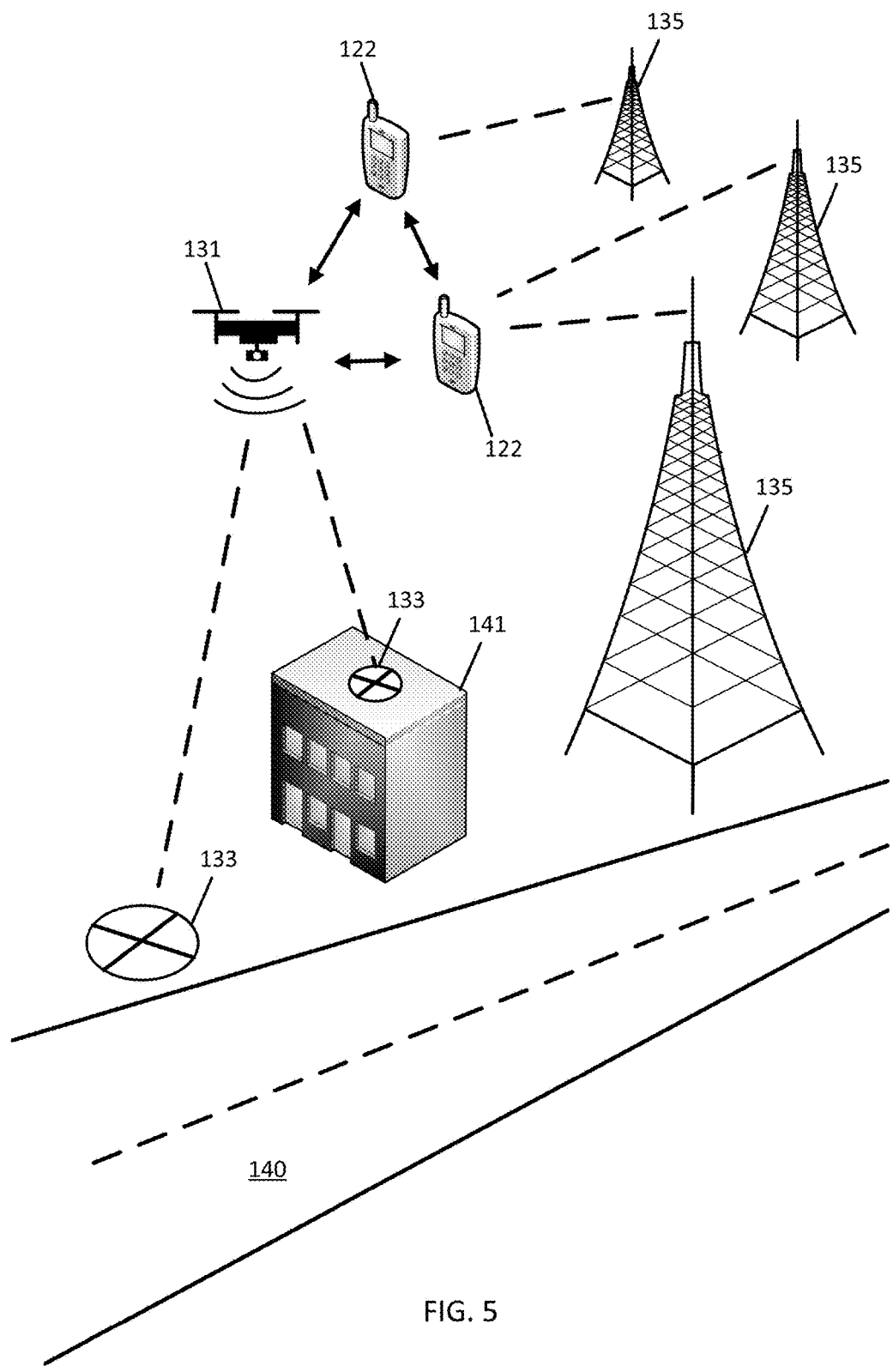
FIG. 5 illustrates another example collaborative localization technique.

FIG. 5 illustrates another example collaborative localization technique for a set of mobile terminals includes an aerial vehicle 131 and two or more mobile devices 122. Each of the aerial vehicle 131 and the mobile devices 122 may perform a local localization as well as a global localization based on data received from the other mobile terminal. For example, the aerial vehicle 131 may determine localization from the SLAM database and relative locations from the peer-to-peer communication (e.g., 5G network), which are combined for the local localization of the aerial vehicle 131.

Each of the mobile devices 122 may perform local localization based on signals received from base stations or towers 135. The local localization may use any combination of signal-based ranging, triangulation, trilateration or other techniques. Each of the mobile devices 122 may calculate a confidence level for their respective local localization. The confidence level may be impacted by the proximity and number of base stations or towers from which the localization is performed. As shown in FIG. 4, one of the mobile devices 122 performs localization from one tower 135, which may correspond to a low confidence level, and one of the mobile devices 122 performs localization from two towers 135, which may correspond to a high confidence level.

The aerial vehicle 131 may perform local localization for the aerial vehicle 131 based on marker 133. The marker 133 may be associated with a particular geographic location, for example, as stored in geographic database 123. The aerial vehicle 131 may calculate a confidence level for the localization based on marker 133. The confidence level may depend on calculations from the marker 133 using computer vision or image processing techniques. The confidence level may depend on the spatial resolution of the marker 133 or the calculations in the pattern matching algorithm in identifying the marker 133. The confidence level may depend on one or more camera properties. Localization from the marker 133 may have a set confidence level.

The aerial vehicle 131 may select between multiple markers 133. The markers 133 may be on a roadway 140, adjacent to roadway 140, on a building 141, or another location. As shown in FIG. 4, a single aerial vehicle 131 may be in range of imaging two or more markers 133. The aerial vehicle 131 may compare the markers to select the better marker 133. The aerial vehicle 131 may compare the confidence levels of the two or more markers 133 and select the highest confidence level.

The aerial vehicle 131 may generate a navigation command or flying command based on the markers 133. For example, the aerial vehicle 131 may increase the confidence level by flying closer to a marker 133.

The aerial vehicle 131 may perform localization using the marker 133 with the higher confidence level. The aerial vehicle 131 may perform localization using the two or more markers 133 in combination. The aerial vehicle 131 performs local localization of the aerial vehicle 131 based on one or more of the identity of the marker 133 matched to geographic database 123, the orientation or angle of the marker 133 calculated from an image of the marker 133, and/or the height of the aerial vehicle 131 determined from sensor data.

The results of local localization in the aerial vehicle 131, which may include a confidence level for each of two or more markers 133, may be sent to the mobile device 122 for the global localization from the peer to peer network 137. The distance between the aerial vehicle 131 and the mobile device 122 may be determined from an analysis of the signals transmitted through the peer to peer network 137. The analysis may include a comparison of a signal strength (e.g., RSSI or another power measurement) to one or more expected signal strengths. The analysis may include the free space path loss relationship between signal strength and distance. The aerial vehicle 131 (or the collaborative localization controller 121) performs collaborative localization by combining the localization from the aerial vehicle 131 with the localization from the mobile device 122.

Figure 6:
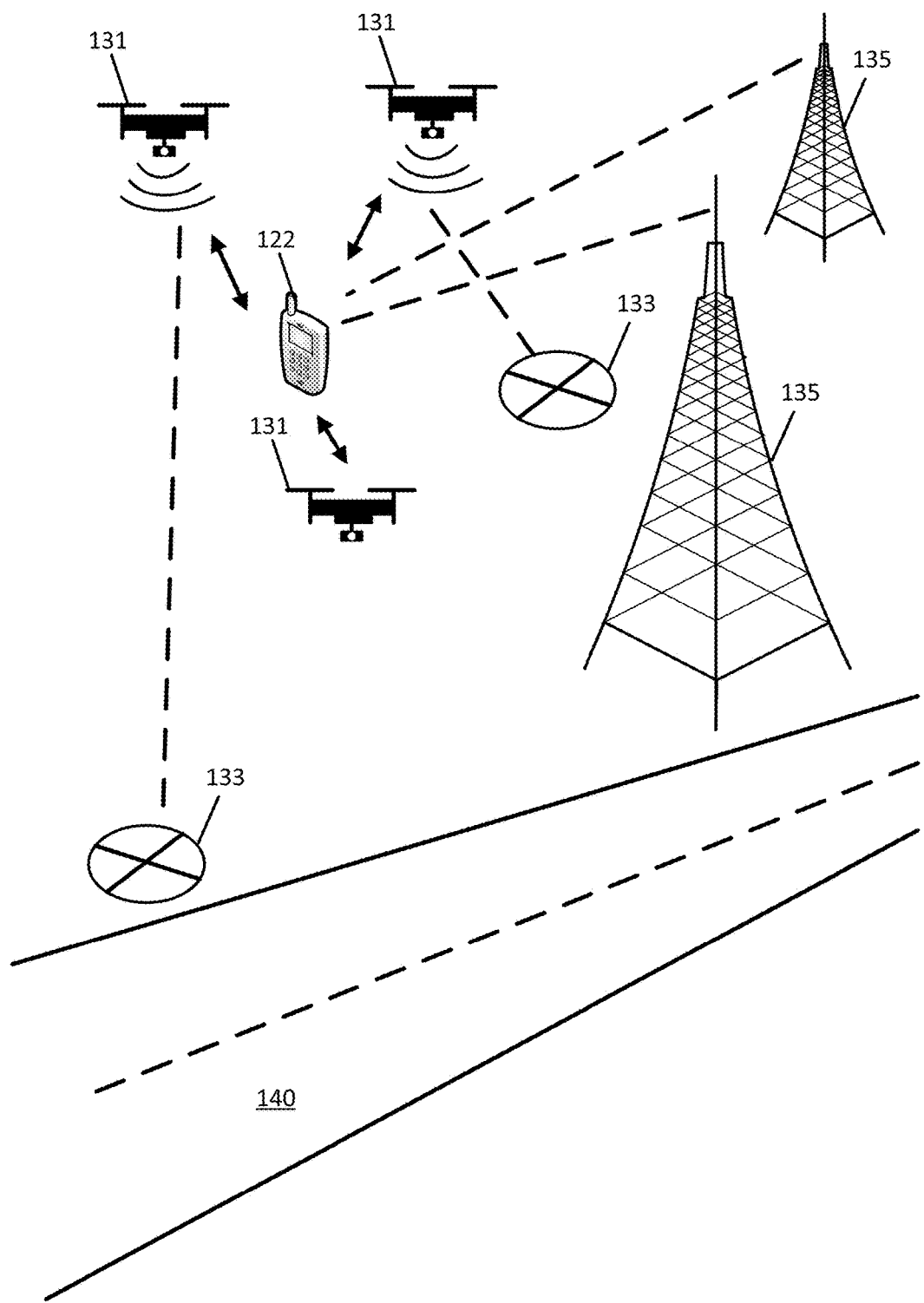
FIG. 6 illustrates another example collaborative localization technique.

FIG. 6 illustrates another example collaborative localization technique including a mobile device 122 in communication with multiple aerial vehicles 131. Any of the mobile terminals (e.g., mobile device 122) may identify or determine a first confidence for localization at the mobile terminal, may identify or determine a second confidence level from a first neighboring device and may identify or determine a third confidence level from a second neighboring device. The mobile terminal may perform a comparison of the second confidence level to the third confidence level and select the first neighboring device or the second neighboring device for the collaborative localization calculation based on the comparison.

Each of the aerial vehicles 131 may detect a different marker 133 using the techniques described herein. One or more of the aerial vehicles 131 may detect no marker.

The mobile device 122 may perform global localization using the location data determined from each of the aerial vehicles 131 by analyzing the markers 133. The global localization of the mobile device 122 may combine (e.g., average) the local localization results from each of the aerial vehicles 131.

The mobile device 122 may perform global localization using the location data determined from each of the aerial vehicles 131 by selecting one of the aerial vehicles 131 have the most accurate local localization. Each of the aerial vehicles 131 may calculate a confidence level and forward the confidence level to the mobile device 122, which compares the confidence levels and selects the aerial vehicle 131 having the highest confidence level. The mobile device 122 may use the location received from the aerial vehicle 131 having the highest confidence level.

The mobile device 122 may also compare the confidence level of the aerial vehicle 131 to a confidence level calculation at the mobile device 122 for the local localization technique of the mobile device 122. The mobile device 122 may perform local localization based on signals received from base stations or towers 135. The local localization may use any combination of signal-based ranging, triangulation, trilateration or other techniques. When the confidence level for the local localization based on signals received from base stations or towers 135 is greater than the confidence level from the aerial vehicle 131, the mobile device's local localization results are selected for the location estimate. When the confidence level from the aerial vehicle 131 is greater than the local localization based on signals received from base stations or towers 135, the aerial vehicle's localization results are selected for the location estimate.

Figure 7:
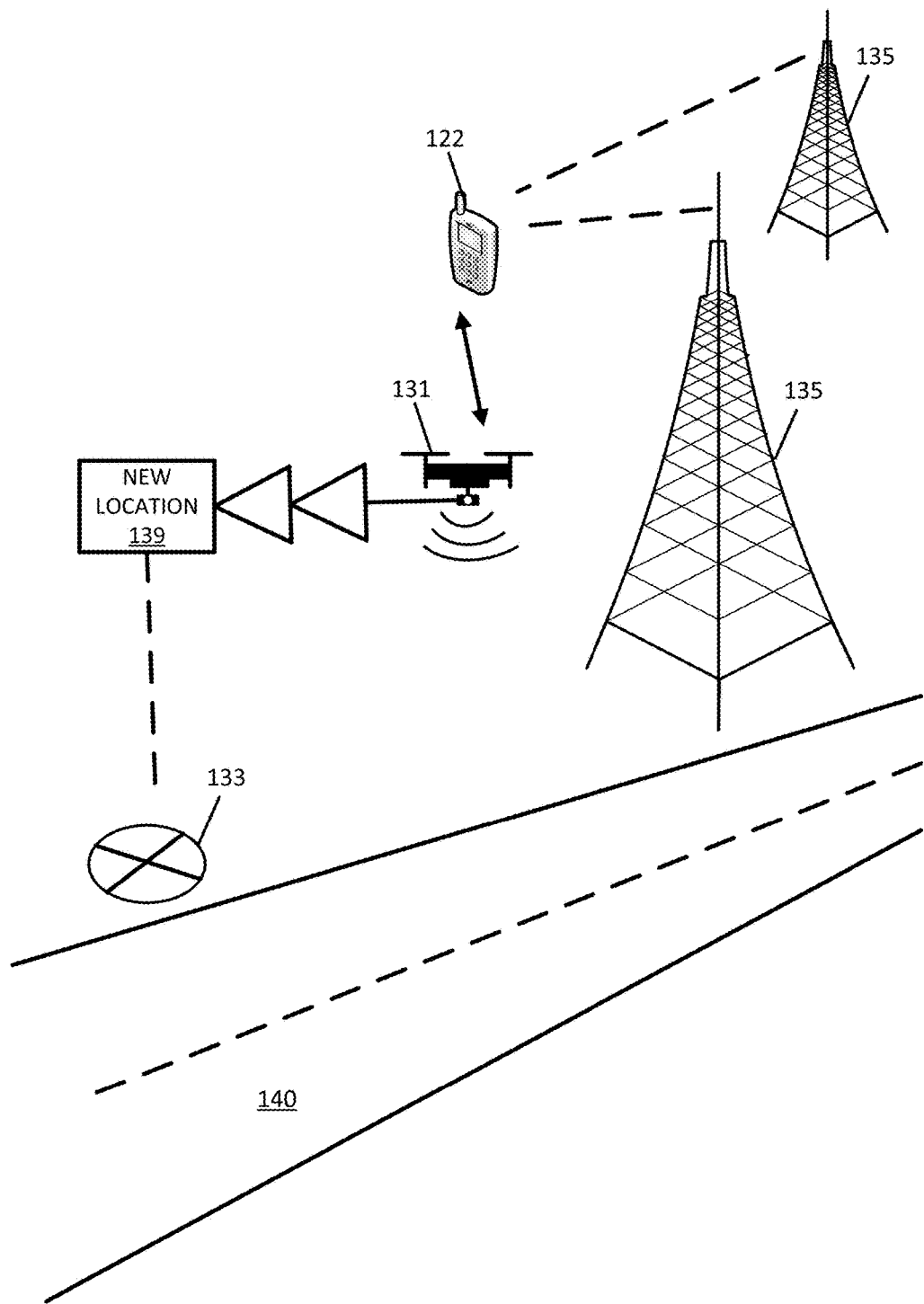
FIG. 7 illustrates another example collaborative localization technique.

FIG. 7 illustrates another example collaborative localization technique for a mobile terminal and at least one neighboring device. The mobile terminal and/or the at least one neighboring device are configured to generate a flight command for the one or more neighboring devices based on confidence levels from the global localization data compared to a collaborative location threshold. For example, an aerial vehicle 131 contributes to the collaborative localization by moving to optimal locations where its own sensors than produce the most accurate location estimates and supply this to the network so that all nodes can benefit from this up to date information.

The example of FIG. 7 includes a set of mobile terminals includes an aerial vehicle 131 and a mobile device 122. Each of the aerial vehicle 131 and the mobile devices 122 may perform a local localization as well as a global localization based on data received from the other mobile terminal. Each of the aerial vehicle 131 and the mobile devices 122 may calculate a confidence level based on any of the techniques described herein.

The mobile device 122 may perform comparison the confidence levels or a comparison of the confidence level from the aerial vehicle to the collaboration threshold. The mobile device 122 may generate a navigation command or flying command based on the comparison or instruct the aerial vehicle 131 to generate a navigation command or flying command based on the comparison.

The instruction from the mobile device 122 to the aerial vehicle 131 may request a better estimate for the local localization performed by the aerial vehicle 131. The instruction from the mobile device 122 may request that the aerial vehicle 131 improve the confidence level by performing additional measurements for localization. The aerial vehicle 131 may travel in the direction of the marker 133 in order to improve the confidence level of the localization. Traveling towards the marker 133 may improve the resolution or size in the image of the marker 133.

Alternatively, the instruction from the mobile device 122 to the aerial vehicle 131 may include a command for the aerial vehicle 131 to travel toward the marker 133 or reduce altitude. Alternatively, the instruction from the mobile device 122 to the aerial vehicle 131 may include a command for the aerial vehicle 131 to travel toward the mobile device 122.

Figure 8:
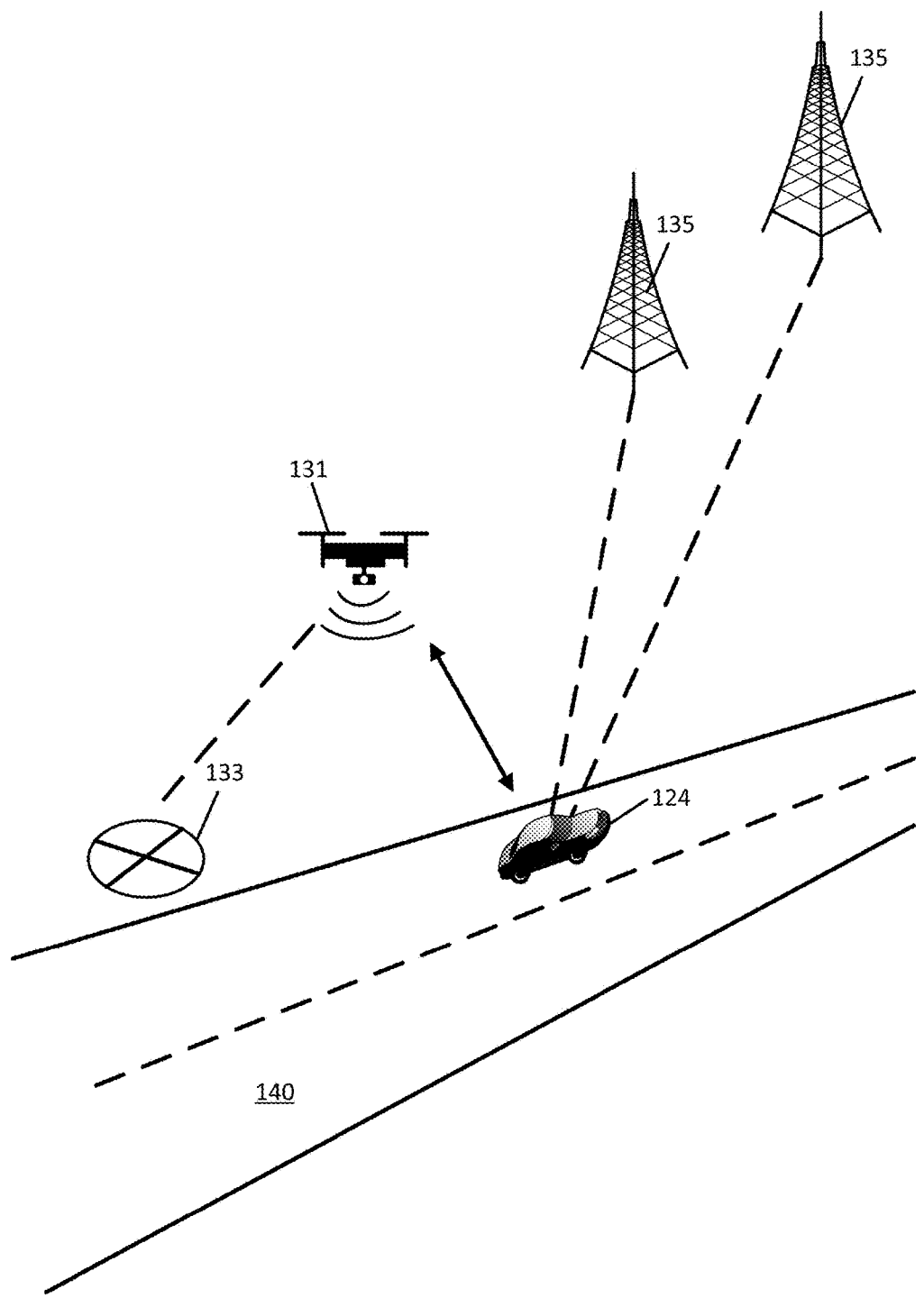
FIG. 8 illustrates another example collaborative localization technique.

FIG. 8 illustrates another example collaborative localization technique for a set of mobile terminals including an aerial vehicle 131 and a vehicle 124. Each of the aerial vehicle 131 and the vehicle 124 may perform a local localization as well as a global localization based on data received from the other mobile terminal.

The vehicle 124 may perform local localization based on signals received from GPS signals or signals from base stations or towers 135. The local localization may use any combination of signal-based ranging, triangulation, trilateration or other techniques.

The aerial vehicle 131 may perform local localization for the aerial vehicle 131 based on marker 133. The marker 133 may be associated with a particular geographic location, for example, as stored in geographic database 123. The aerial vehicle 131 may also detect a height or altitude of the aerial vehicle 131 from sensor data. The sensor data may include pressure measurements, GPS measurements, or measurements from an IMU.

The aerial vehicle 131 performs local localization of the aerial vehicle 131 based on one or more of the identity of the marker 133 matched to geographic database 123, the orientation or angle of the marker 133 calculated from an image of the marker 133, and/or the height of the aerial vehicle 131 determined from sensor data.

The results of local localization in the aerial vehicle 131 may be sent to the vehicle 124 for the global localization from the peer to peer network 137. The distance between the aerial vehicle 131 and the vehicle 124 may be determined from an analysis of the signals transmitted through the peer to peer network 137. The analysis may include a comparison of a signal strength (e.g., RSSI or another power measurement) to one or more expected signal strengths. The analysis may include the free space path loss relationship between signal strength and distance. The aerial vehicle 131 (or the collaborative localization controller 121) performs collaborative localization by combining the localization from the aerial vehicle 131 with the localization from the mobile device 122.

The vehicle 124 may determine whether the use the localization of the vehicle 124 or the localization of the aerial vehicle 131. The vehicle 124 may compare the confidence level of the aerial vehicle 131 to the confidence of the vehicle 124 and select the localization with the higher confidence. The vehicle 124 may translate the location of the aerial vehicle 131 to the reference point of the vehicle 124 based on the distance and direction of a vector between the aerial vehicle 131 and the vehicle 124.

Figure 9:
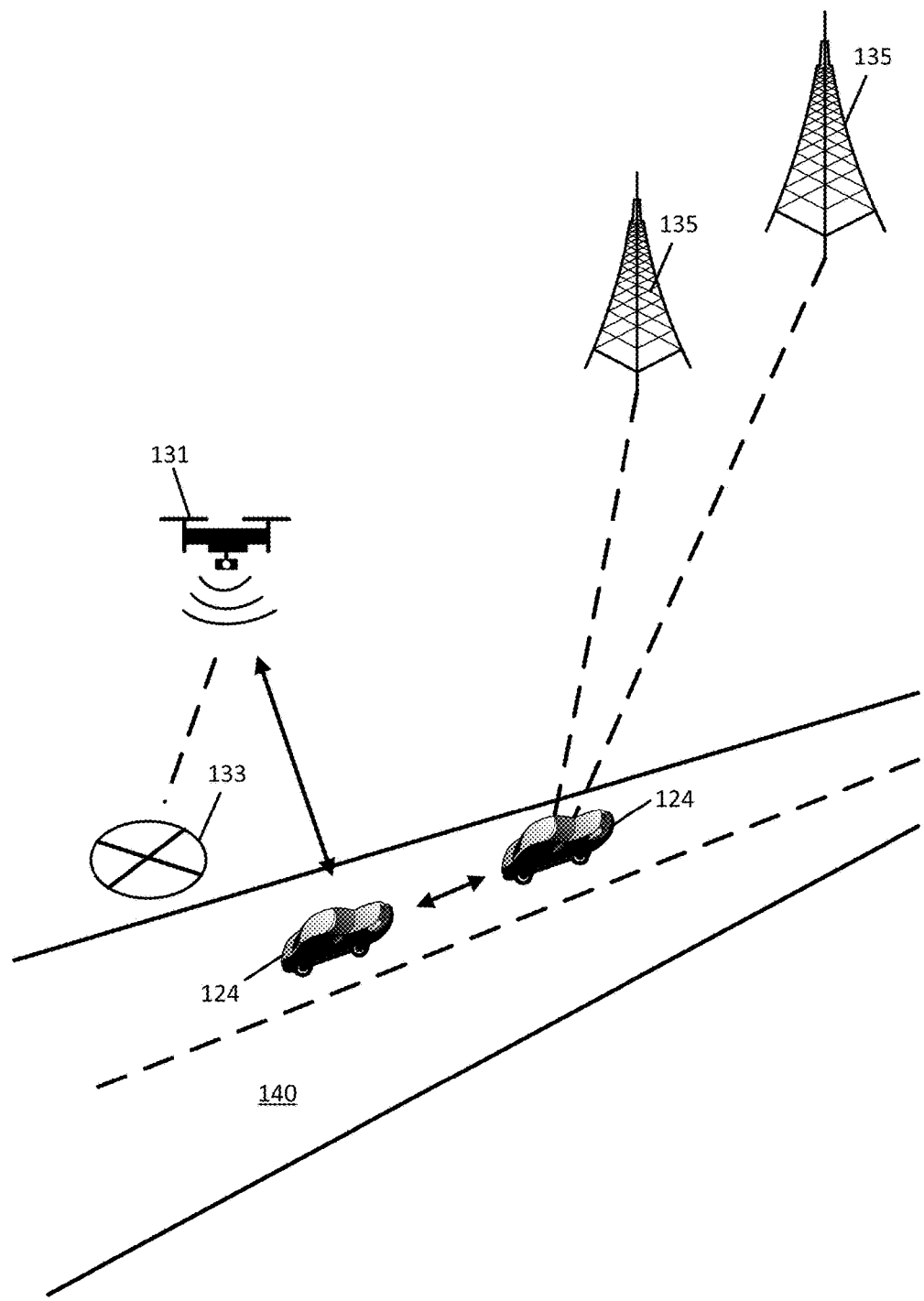
FIG. 9 illustrates another example collaborative localization technique.

FIG. 9 illustrates another example collaborative localization technique for two or more vehicles 124. One of the vehicles may perform localization from GPS signals or signals from base stations or towers 135. The local localization may use any combination of signal-based ranging, triangulation, trilateration or other techniques. The other vehicle may receive localization data from the aerial vehicle 131. The vehicles 124 may exchange location data from the respective localization techniques. One or both of the vehicle 124 may calculate a distance and direction (e.g., difference vector). Each of the vehicles 124 may evaluate the location data from the respective localization techniques along with the difference vector to calculate global localization for the vehicle 124.

Figure 10:
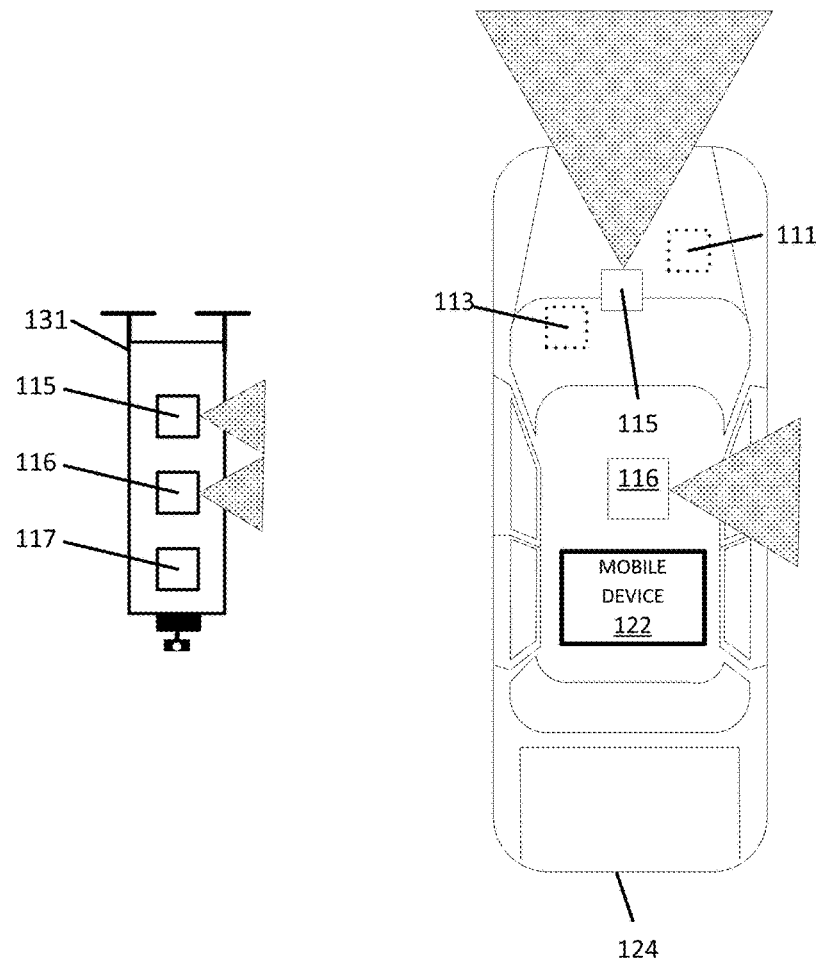
FIG. 10 illustrates exemplary vehicles of the systems of FIGS. 1-9.

FIG. 10 illustrates an exemplary aerial vehicle 131 and exemplary vehicle 124, which may be referred to individually or collectively as vehicles, of the systems of FIGS. 1-9. The vehicles may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle. The positioning system may also include a receiver and correlation chip to obtain a GPS or GNSS signal. Alternatively or additionally, the one or more detectors or sensors may include an accelerometer built or embedded into or within the interior of the vehicle.

A connected vehicle includes a communication device and an environment sensor array for reporting the surroundings of the vehicle to the server 125. The vehicle 124 may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to geographic data received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to geographic data received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on to geographic data received from geographic database 123 and the server 125 and driving commands or navigation commands.

Figure 11:
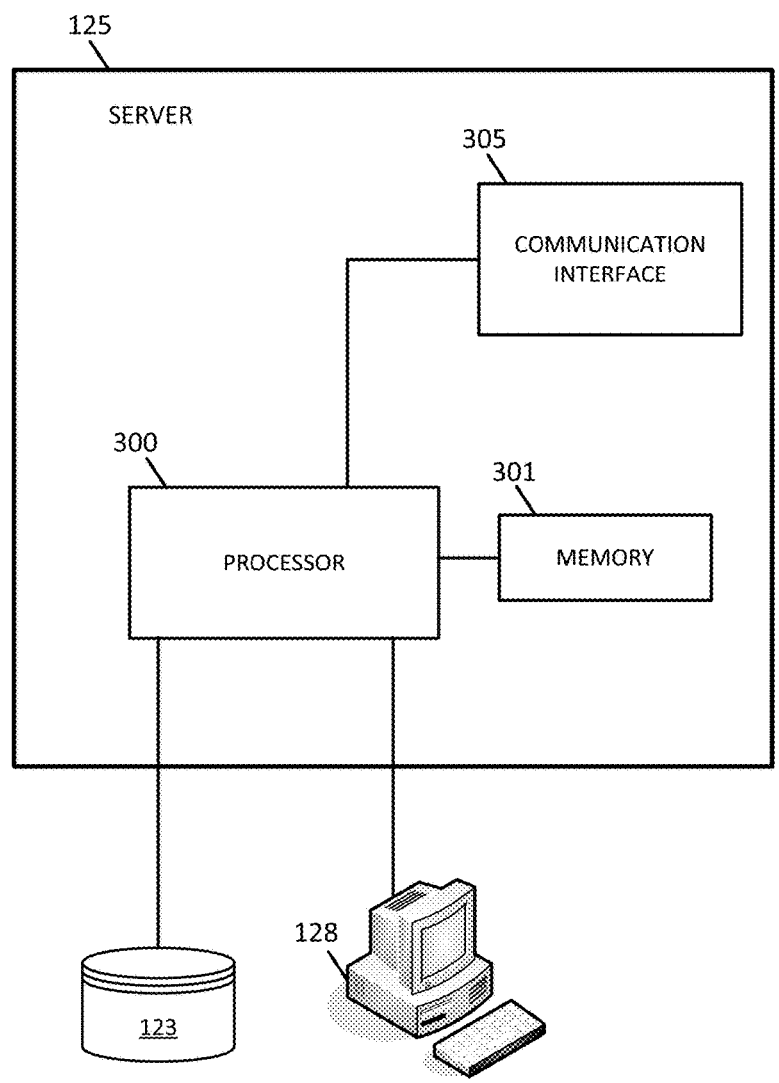
FIG. 11 illustrates an example server.

FIG. 11 illustrates an example server 125, which may apply to the system of FIG. 1. The server 125 includes a processor 300, a communication interface 305, a memory 301, and a database 123. Additional, different, or fewer components may be included.

The processor 300 may implement the functions associated with the collaborative localization controller 121, the local localization module 41, the global localization module 42, and the relative localization module 44. The communication interface 305 receives the localization data from the mobile terminals. The memory 301 stores the localization data received from the mobile terminals. The processor 300 evaluates the localization data in order to determine the location of one or more of the mobile terminals. In addition, the communication interface 305 may receive confidence levels from the mobile terminals, or alternatively, the processor 300 may calculate the confidence levels. An input device (e.g., keyboard or personal computer 128) may be used to enter settings to the server 125. The settings may include settings for assigning the confidence levels to the localization techniques or the type of device. The settings may include priority of localization from different types of mobile terminals. For example, the settings may establish that localization based on static anchors or markers are the highest priority or highest confidence level, localization based on distance data from local objects is a medium priority or medium confidence level, and localization based on signal time difference or angle calculation are low priority or low confidence level.

Figure 12:
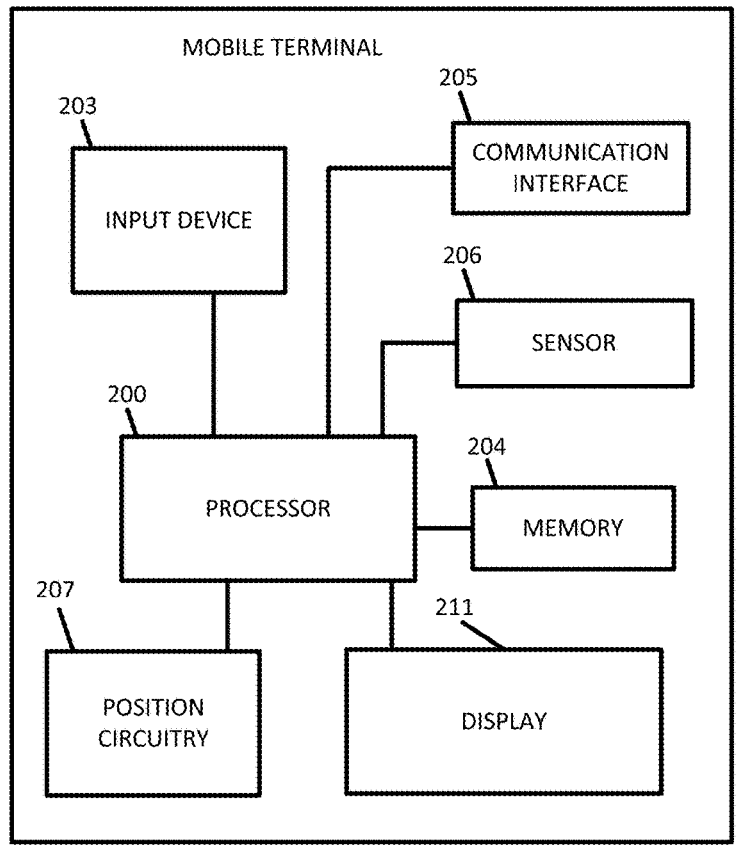
FIG. 12 illustrates an example mobile device.
Figure 13:
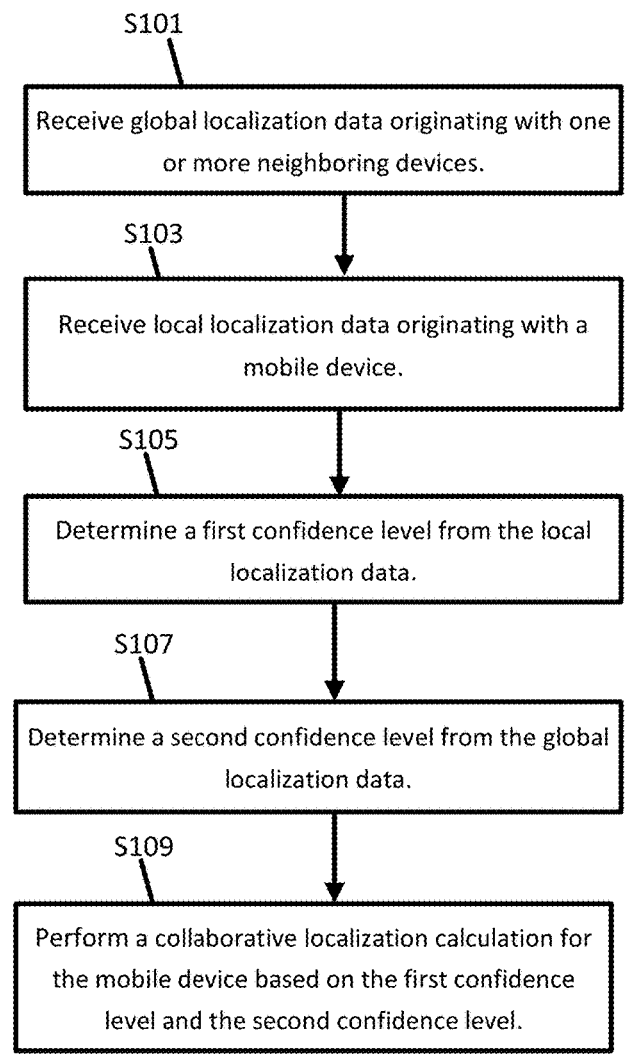
FIG. 13 illustrates an example flowchart for the mobile device of FIG. 12.

FIG. 12 illustrates an exemplary mobile device 122 of the system of FIG. 1. The mobile device 122 includes a processor 200, a memory 204, an input device 203, a communication interface 205, position circuitry 207, a display 211, and a sensor 206. The input device 203 may receive commands from the user for default settings for the localization techniques. The default settings may include confidence levels for different types of devices or localization techniques. FIG. 13 illustrates an example flowchart for the operation of mobile device 122. Additional, different, or fewer acts may be provided.

At act S101, the processor 200 or the communication interface 205 receives first localization data originating with one or more neighboring devices. The global localization data includes localization performed at the one or more neighboring devices. The first localization data may include a location derived from an image of a marker collected by the at least one aerial vehicle. An image of the marker is analyzed to decode a symbol or character in the marker which is matched with a geographic database.

The communication interface 205 is one example means for receiving global localization data originating with one or more neighboring devices. The processor 200 may also include circuitry serving as means for receiving global localization data originating with one or more neighboring devices.

At act S103, the processor 200 or the communication interface 205 receives local localization data originating with a mobile device. The processor 200 may perform a second localization technique to generate first localization data. The position circuitry 207 or the sensor 206 detects a geographic position of the mobile terminal (e.g., mobile device 122 or the vehicle 124). The position circuitry 207 is one example means for detecting or determining a geographic position. The processor 200 may also include circuitry serving as means for detecting or determining a geographic position. The detected geographic position of the mobile device 122 may include a latitude and longitude pair. The geographic position may be detected or sampled at periodic intervals in time or distance or may be continuously detected. The sensor 206, which may include GNSS sensors, distancing sensors, range sensor, image sensors, or another sensor as described with respect to FIG. 10 may also provide information for determining the geographic position of the mobile device 122. The communication interface 205 is one example means for receiving local localization data originating with a mobile device. The processor 200 may also include circuitry serving as means for receiving local localization data originating with a mobile device.

At act S105, the processor 200 determines a first confidence level or accuracy level from the local localization data. At act S107, the processor 200 determines a second confidence level or second accuracy level from the global localization data. The first localization data may have a degree of accuracy that is greater that of the second localization data. The degree of accuracy may be an error margin that is the difference between the detected location and the actual location. The degree of accuracy may be measured in a distance. The degree of accuracy may depend on the localization technique. For example, localization techniques that are measured from static objects using distancing sensors, range sensors, or image sensors may have a degree of accuracy that is more accurate (e.g., smaller distance) than the degree of accuracy of GNSS sensors. The degree of accuracy may depend on the ambient conditions such as precipitation. The degree of accuracy may depend on whether the mobile terminal has a line of sight to the static objects. The degree of accuracy may be measured from the localization data (e.g., consistent data indicates high accuracy and inconsistent data indicates low accuracy). The degree of accuracy may be self-reported by the mobile terminal to the other mobile terminals. The degrees of accuracy may be combined with the localization data in messages sent between mobile terminals.

At act S109, the processor 200 performs a collaborative localization calculation for the mobile device based on the first confidence level and the second confidence level. The processor 200 may access a collaboration threshold from memory 201. The processor 200 may compare the threshold to the first confidence level. When the threshold is greater than the first confidence level, the first localization data is used. When the threshold is less than the first confidence level, the second localization data is used. Alternatively, the collaborative localization calculation may compare the first and second thresholds. When the second confidence level is greater than the first confidence level, the second localization data is used. When the second confidence threshold is less than the first confidence level, the first localization data is used. The processor 200 may include a routing module including an application specific module or processor that is configured to perform the collaborative localization technique.

The processor 200 may include a routing module including an application specific module or processor that calculates routing between an origin and destination. The routing module is an example means for generating a route according to the selected localization data, which may be the local localization data or the global localization data. The routing command may be a driving instruction (e.g., turn left, go straight), which may be presented to a driver or passenger, or sent to an assisted driving system. The display 211 is an example means for displaying the routing command.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Figure 14:
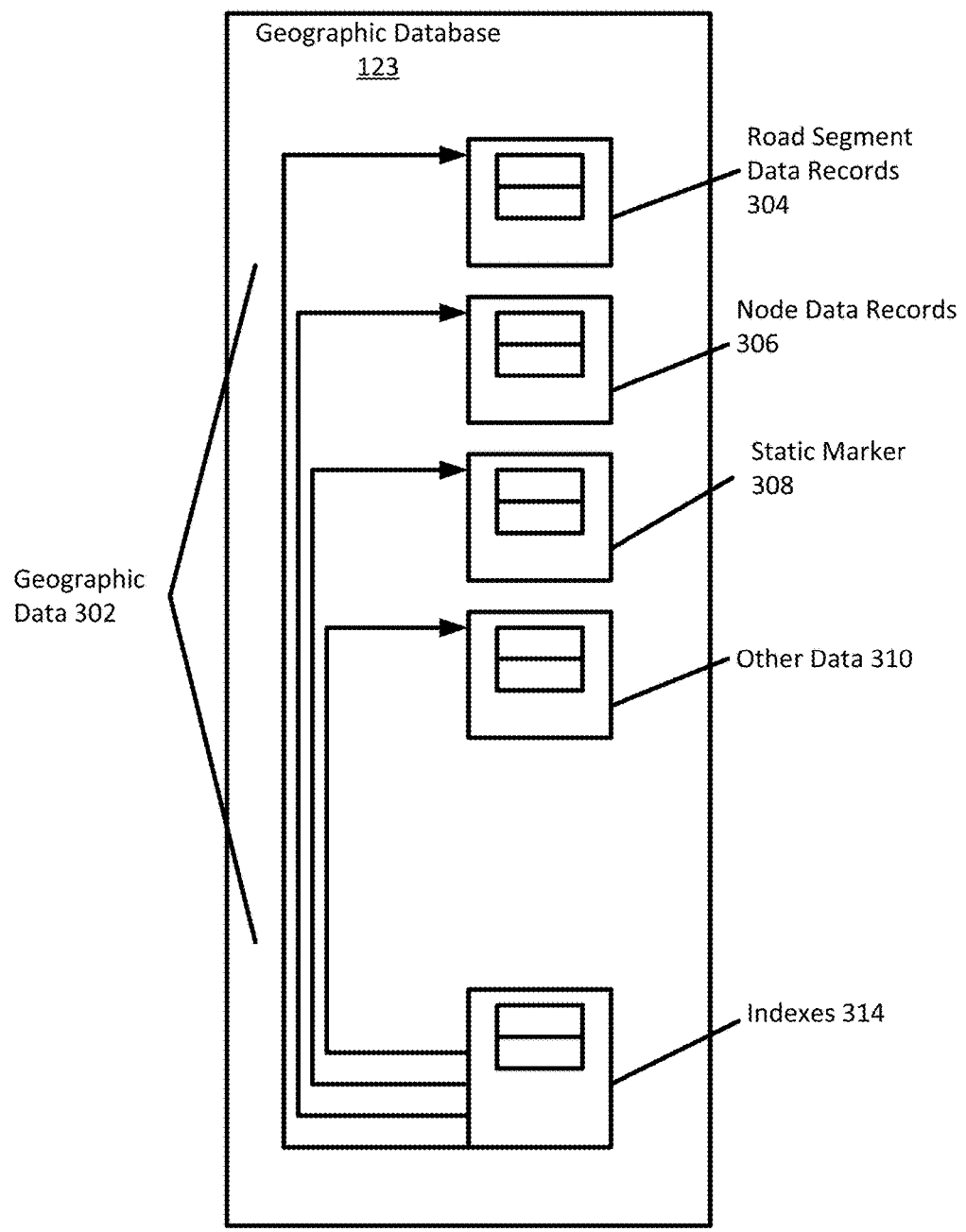
FIGS. 14 and 15 illustrate example geographic databases.

In FIG. 14, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region. The geographic database 123 may be a localization database include static features or objects such as markers for localization calculations.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may static marker data 308 with a geographic location or a road segment in the segment data records 304 or a geographic coordinate. An index 314 may, for example, store static marker data 308 in relation to geographic locations or objects relating to one or more locations.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 15:
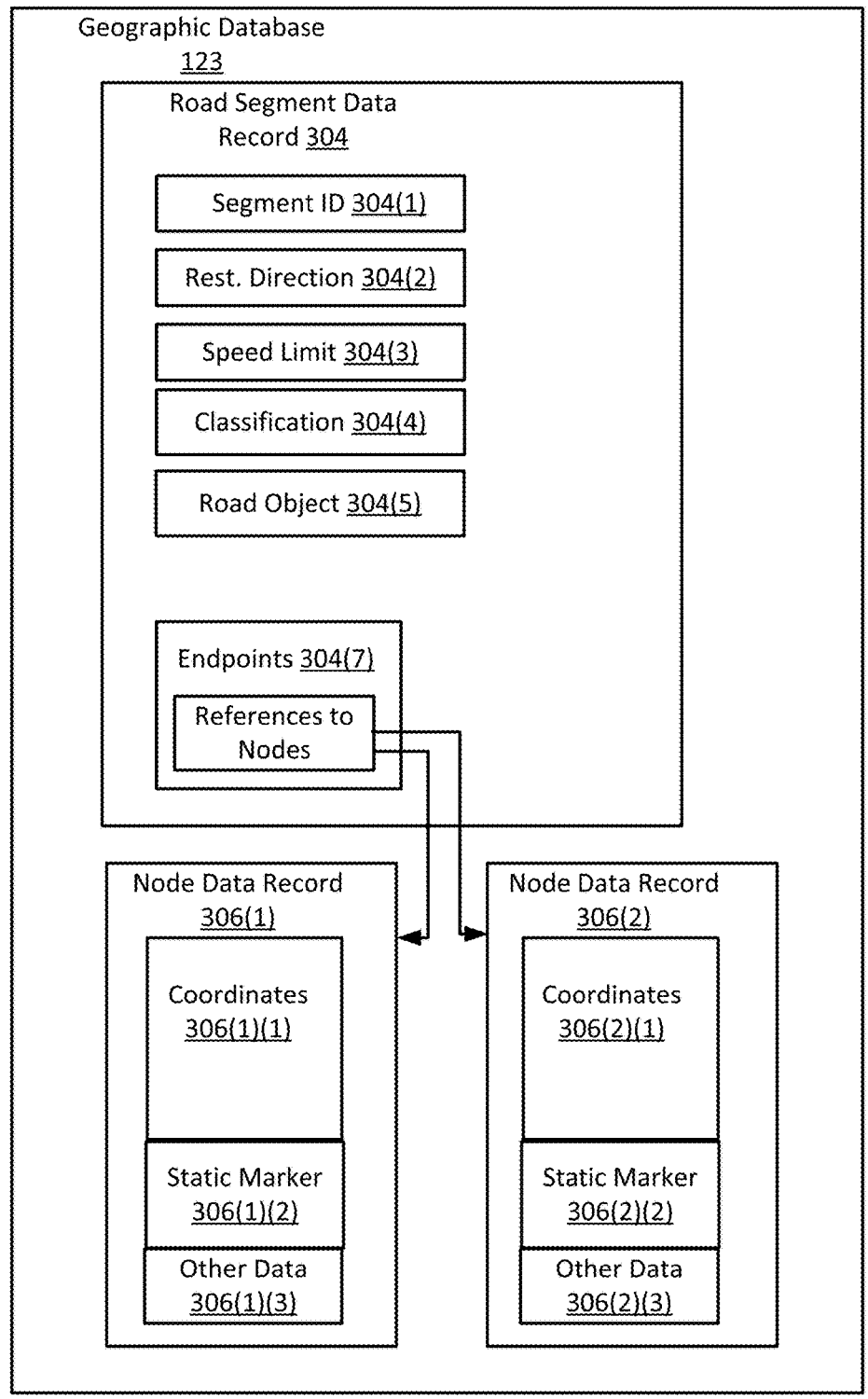

FIG. 15 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 15 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and static marker data 306(1)(2) and 306(2)(2), which may include geographic locations and identity codes associated with specific markers. The static marker data 306(1)(2) and 306(2)(2) may change dynamically or over time as markers are added and removed from the geographic database 123. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor (controller) 200 and/or processor (controller) 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer, and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for collaborative localization of multiple devices in a geographic area, the method comprising:
  receiving global localization data originating with one or more neighboring devices;
  receiving local localization data originating with a mobile device;
  determining a first confidence level from the local localization data;
  determining a second confidence level from the global localization data; and
  performing, by a processor, a collaborative localization calculation for the mobile device based on the first confidence level and the second confidence level.

Embodiment 2

The method of embodiment 1, wherein the one or more neighboring devices includes at least one aerial vehicle.

Embodiment 3

The method of any of embodiments 1 and 2, wherein the global localization data includes location data derived from an image of a marker collected by the at least one aerial vehicle.

Embodiment 4

The method of any of embodiments 1-3, wherein the image of the marker is matched with a geographic database.

Embodiment 5

The method of any of embodiments 1-4, wherein the local localization data includes include signal based ranging, object based ranging, triangulation, or trilateration.

Embodiment 6

The method of any of embodiments 1-5, wherein the local localization data includes (GPS).

Embodiment 7

The method of any of embodiments 1-6, further comprising:
calculating a relative position between the mobile device and the one or more neighboring devices.

Embodiment 8

The method of any of embodiments 1-7, wherein the relative position is calculated from time of arrival, time difference of arrival, angle of arrival, trilateration, or triangulation.

Embodiment 9

The method of any of embodiments 1-8, further comprising:
identifying a collaborative location threshold; and
performing a comparison of the second confidence level from the global localization data to the collaborative location threshold.

Embodiment 10

The method of any of embodiments 1-9, further comprising:
generating a flight command for the one or more neighboring devices based on the comparison of the second confidence level from the global localization data to the collaborative location threshold.

Embodiment 11

The method of any of embodiments 1-10, wherein the one or more neighboring devices includes two neighboring devices and the second confidence level is from a first neighboring device, the method comprising:
determining a third confidence level from a second neighboring device;
performing a comparison of the second confidence level to the third confidence level; and
selecting the first neighboring device or the second neighboring device for the collaborative localization calculation based on the comparison.

Embodiment 12

The method of any of embodiments 1-11, wherein a distance and a direction between the mobile device and one or more neighboring devices is calculated from a signal transmitted between the mobile device and one or more neighboring devices.

Embodiment 13

An apparatus, configured to perform and/or control the method of any of embodiments 1-12 or comprising means for performing and/or controlling any of embodiments 1-12.

Embodiment 14

An apparatus, comprising at least one processor and at least one memory including computer program code for one or more programs, the at least one memory and the computer program code configured to, with the at least one processor, to perform and/or control the method of any of embodiments 1-12.

Embodiment 15

A computer program comprising instructions operable to cause a processor to perform and/or control the method of any of embodiments 1-12, when the computer program is executed on the processor.

I claim:

1. A method for collaborative localization of multiple devices in a geographic area, the method comprising:
receiving global localization data originating with one or more neighboring devices;
receiving local localization data originating with a mobile device;
determining a first confidence level from the local localization data;
determining a second confidence level from the global localization data; and
performing, by a processor, a collaborative localization calculation for the mobile device based on the first confidence level and the second confidence level.

2. The method of claim 1, wherein the one or more neighboring devices includes at least one aerial vehicle.

3. The method of claim 2, wherein the global localization data includes location data derived from an image of a marker collected by the at least one aerial vehicle.

4. The method of claim 3, wherein the image of the marker is matched with a geographic database.

5. The method of claim 1, wherein the local localization data includes include signal based ranging, object based ranging, triangulation, or trilateration.

6. The method of claim 1, wherein the local localization data includes global positioning system (GPS) data.

7. The method of claim 1, further comprising:
calculating a relative position between the mobile device and the one or more neighboring devices.

8. The method of claim 7, wherein the relative position is calculated from time of arrival, time difference of arrival, angle of arrival, trilateration, or triangulation.

9. The method of claim 1, further comprising:
identifying a collaborative location threshold; and
performing a comparison of the second confidence level from the global localization data to the collaborative location threshold.

10. The method of claim 9, further comprising:
generating a flight command for the one or more neighboring devices based on the comparison of the second confidence level from the global localization data to the collaborative location threshold.

11. The method of claim 1, wherein the one or more neighboring devices includes two neighboring devices and the second confidence level is from a first neighboring device, the method comprising:

determining a third confidence level from a second neighboring device;
performing a comparison of the second confidence level to the third confidence level; and
selecting the first neighboring device or the second neighboring device for the collaborative localization calculation based on the comparison.

12. The method of claim 1, wherein a distance and a direction between the mobile device and one or more neighboring devices is calculated from a signal transmitted between the mobile device and one or more neighboring devices.

13. An apparatus for collaborative localization of multiple devices in a geographic area, the apparatus comprising:
a localization database including global localization data originating with one or more neighboring devices and associated with a first confidence level based on a variance of the global localization data and local localization data originating with a mobile device and associated with a second confidence level based on a variance of the local localization data; and
a collaborative localization controller configured to perform a collaborative localization calculation for the mobile device based on the first confidence level and the second confidence level.

14. A system for collaborative localization of multiple devices in a geographic area, the system comprising:
a mobile device configured to perform a first localization and calculate a first confidence level; and
a drone configured to perform a second localization and calculate a second confidence level,
wherein a collaborative localization calculation for a location of the mobile device is based on the first confidence level, the second confidence level, the first localization, and the second localization.

15. The system of claim 14, further comprising:
a server configured to perform the collaborative localization calculation for the mobile device based on the first confidence level, the second confidence level, the first localization, and the second localization.

16. The system of claim 14, wherein the mobile device is configured to perform the collaborative localization calculation for the mobile device based on the first confidence level, the second confidence level, the first localization, and the second localization.

17. The system of claim 14, wherein the collaborative localization calculation includes a comparison of the first confidence level and the second confidence level.

18. The system of claim 14, wherein when the first confidence level exceeds the second confidence level, localization calculated at the mobile device is applied to the location of the mobile device.

19. The system of claim 14, wherein when the second confidence level exceeds the first confidence level, localization calculated at an aerial vehicle is applied to the location of the mobile device.

20. The system of claim 19, wherein the localization calculated at the aerial vehicle is based on a static marker calibrated with a geographic database.

* * * * *